(12) United States Patent
Bowling et al.

(10) Patent No.: US 8,371,157 B2
(45) Date of Patent: Feb. 12, 2013

(54) ENGINE POSITION TRACKING FOR INTERNAL COMBUSTION ENGINES

(75) Inventors: Bruce Bowling, Havre De Grace, MD (US); Albert Grippo, Virginia Beach, MD (US)

(73) Assignee: BG Soflex LLC., Virginia Beach, VA (US)

( * ) Notice: Subject to any disclaimer, the term of this patent is extended or adjusted under 35 U.S.C. 154(b) by 198 days.

(21) Appl. No.: 12/824,859

(22) Filed: Jun. 28, 2010

(65) Prior Publication Data

US 2010/0263439 A1 Oct. 21, 2010

Related U.S. Application Data

(62) Division of application No. 12/100,221, filed on Apr. 9, 2008, now Pat. No. 7,814,780.

(60) Provisional application No. 60/910,739, filed on Apr. 9, 2007.

(51) Int. Cl.
*G01M 15/06* (2006.01)
(52) U.S. Cl. .................................................. 73/114.26
(58) Field of Classification Search ............... 73/114.02, 73/114.03, 114.04, 114.26, 114.27, 114.28
See application file for complete search history.

(56) References Cited

U.S. PATENT DOCUMENTS

| | | | |
|---|---|---|---|
| 5,351,528 A | 10/1994 | Fukui et al. | |
| 6,553,816 B1 * | 4/2003 | Palanisamy et al. | 73/114.59 |
| 6,612,162 B2 * | 9/2003 | Han et al. | 73/114.27 |
| 6,827,063 B2 * | 12/2004 | Breitegger et al. | 123/406.58 |
| 7,254,991 B2 * | 8/2007 | Stork et al. | 73/114.26 |
| 7,292,933 B2 * | 11/2007 | Christensen | 701/111 |
| 7,530,261 B2 * | 5/2009 | Walters | 73/114.04 |
| 7,543,486 B2 * | 6/2009 | Auclair et al. | 73/114.77 |
| 7,913,545 B2 * | 3/2011 | Verner et al. | 73/114.18 |
| 2006/0042074 A1 * | 3/2006 | Stork et al. | 29/622 |
| 2006/0101902 A1 * | 5/2006 | Christensen | 73/116 |
| 2009/0217744 A1 | 9/2009 | Galtier et al. | |
| 2009/0276138 A1 * | 11/2009 | Verner et al. | 701/102 |

* cited by examiner

*Primary Examiner* — Eric S McCall
(74) *Attorney, Agent, or Firm* — Procopio, Cory, Hargreaves & Savitch, LLP

(57) ABSTRACT

A method for determining engine crankshaft position determines the position of a rotating crankshaft using one or many crankshaft position sensors. The sensor output signals representing crankshaft position are digitized and specific timing positions are derived. The sampled timing positions are compared to a known position template to determine crankshaft position.

4 Claims, 6 Drawing Sheets

Sensor Noise Detection/Elimination

ENGINE POSITION TRACKING FOR INTERNAL COMBUSTION ENGINES

CROSS-REFERENCE TO RELATED APPLICATIONS

This is a divisional application of U.S. application Ser. No. 12/100,221 filed on Apr. 9, 2008 which claims priority from U.S. Provisional Application No. 60/910,739 filed on Apr. 9, 2007 in the United States Patent and Trademark Office, the disclosures of the prior applications are incorporated herein in their entirety by reference.

BACKGROUND OF THE INVENTION

1. Field of the Invention

Methods and apparatuses consistent with the present invention relate to a system and method for engine management, and more particularly to a system and method for sensing an engine crankshaft angle position for use with an engine management system.

2. Description of the Related Art

Calculating instantaneous engine crankshaft angle position is a difficult task when developing a universal automotive Engine Management System (EMS). Automobile manufacturers have used many different engine management schemes. Engine management schemes vary in their use of sensors, position wheels (type, number and location) and algorithms to perform instantaneous engine crankshaft angle position calculations. However, each automobile manufacturer deals with only one or two systems at a time in developing their engine controllers.

In contrast, a universal EMS must be capable of operating with a wide variety of engine crankshaft angle position sensing systems. Therefore, developing an EMS for use with a variety of engines from different automobile manufacturers requires much research and development, as well as computer resources, and places a heavy burden on technical support staff. If the universal EMS system is provided without an engine crankshaft angle position sensing system, the user must then supply one. This adds to the cost of the aftermarket system and to the complexity of installation.

The problem has grown worse in recent years. As manufacturers strive to meet more stringent emissions and fuel economy standards, better positional accuracy and faster initial engine crankshaft angle position synchronization is required. These requirements are especially critical for engines which automatically turn off at idle conditions and restart when throttle movement is sensed.

SUMMARY OF THE INVENTION

Illustrative, non-limiting embodiments of the present invention overcome the above disadvantages and other disadvantages not described above. It will be appreciated, of course, that overcoming the general problems mentioned is not a requirement and that various implementations will fall within the scope and spirit of the invention regardless.

According to an aspect of the present invention, there is provided a method of determining a relative engine crankshaft angle position in a time domain, the method including outputting a timing signal associated with engine crankshaft angle position from an engine-mounted sensor, sampling the timing signal using analog-to-digital conversion and outputting a digitized sensor data stream, processing the digitized sensor data stream to remove noise, applying a threshold to the processed digitized sensor data stream, and calculating a threshold crossing point which indicates the relative engine crankshaft angle position in the time domain.

According to another aspect of the present invention, there is provided a method of determining an instantaneous absolute engine crankshaft angle position, the method including measuring tooth time inputs of an engine-mounted timing wheel, scaling the tooth time inputs into angles in an angle domain, cross-correlating the angles with stored tooth pattern angles, and determining instantaneous absolute engine crankshaft angle position as a result of a match between the angles and the stored tooth pattern angles.

According to another aspect of the present invention, there is provided a system for determining an engine crankshaft angle position including an engine-mounted sensor which outputs a signal associated with engine crankshaft angle position, an analog-to-digital converter which samples the signal output from the engine-mounted sensor and outputs a digitized sensor data stream, a processor which processes the digitized sensor data stream to remove noise, and a threshold detector which applies a threshold to the digitized sensor data stream and calculates a threshold crossing point which indicates an engine crankshaft angle position.

According to another aspect of the present invention, there is provided a computer readable medium having stored therein a program for making a computer execute a method of determining a relative engine crankshaft angle position in a time domain.

According to another aspect of the present invention, there is provided a computer readable medium having stored therein a program for making a computer execute a method of determining an instantaneous absolute engine crankshaft angle position.

BRIEF DESCRIPTION OF THE DRAWINGS

The above and other features and advantages of the present invention will become more apparent by describing in detail exemplary embodiments thereof. The accompanying drawings, which are incorporated in and constitute a part of this specification, illustrate exemplary embodiments of the invention and, together with the description, serve to explain the aspects, advantages and principles of the invention. In the drawings.

DETAILED DESCRIPTION OF THE EXEMPLARY EMBODIMENTS OF THE INVENTION

The following description of exemplary embodiments is merely exemplary in nature and is no way intended to limit the invention, its application, or uses.

The engine crankshaft angle position sensing system described herein consists of unique methods to solve the above problems. Direct Digital Sampling (DDS) allows the use of sensor detection circuitry in the EMS which may not otherwise be compatible with signals from various combinations of engine crankshaft angle position sensor types, amplitude levels, and crankshaft timing wheel tooth shapes and spacings. DDS provides direct sampling of the signals with an analog to digital converter. The digital data from the sampled signals is read in to a processor containing robust and configurable computer code capable of processing various types of signals. The output from DDS is a digital pulse train that accurately reproduces a signal representative of the engine mounted crankshaft timing wheel tooth characteristics in real time. This is termed the relative engine crankshaft angle position in the time domain.

The DDS output is fed into the Correlation Engine which matches the DDS output to user input crankshaft timing wheel configuration versus engine position data. The processor uses correlation and/or mean least square fitting techniques to process the data and calculate the instantaneous absolute engine crankshaft angle position. Typical uses for this positional data may be to control fuel injection and ignition timing, valve open/close times, setting of knock detection windows and other events that may be used for engine control.

Figure 1:
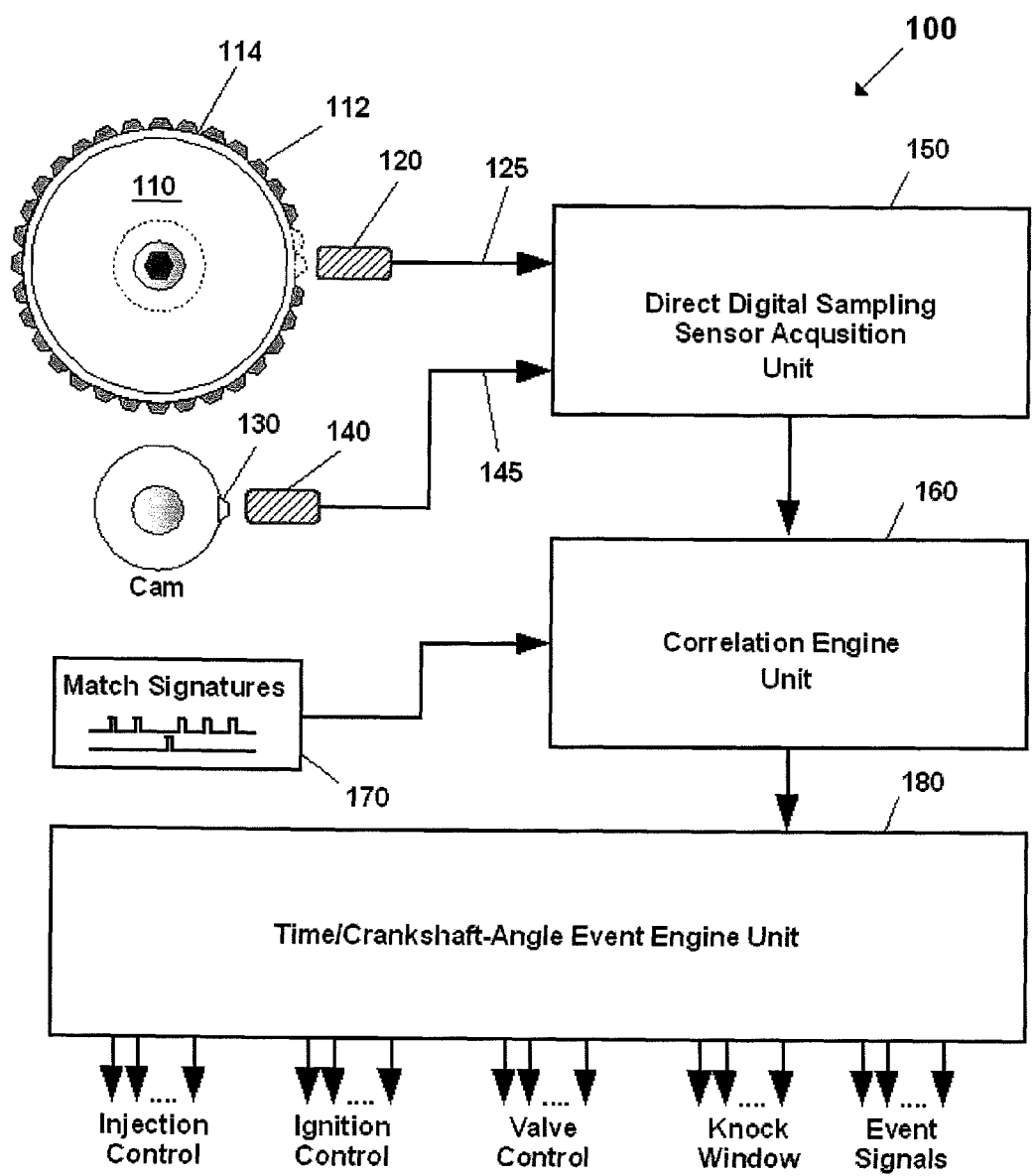
FIG. 1 is a diagram illustrating an engine crankshaft angle position sensing system according to an exemplary embodiment of the present invention.

FIG. 1. is a block diagram illustrating an engine crankshaft angle position sensing system according to an exemplary embodiment of the present invention.

As illustrated in FIG. 1, in the engine crankshaft angle position sensing system 100, a crankshaft timing wheel 110 is affixed to an engine crankshaft (not shown). Although one timing wheel is shown in FIG. 1, multiple crankshaft wheels are possible, for example, for gated signal generation. A first sensor 120 detects teeth 112 or notches 114 in the crankshaft timing wheel 110 and outputs a first electrical signal 125. The first sensor 120 may be, for example, but not limited to, a magnetic, optical, or Hall sensor. In addition, there may be one or more camshaft timing teeth/notches 130 detected by a second sensor 140 which outputs a second electrical signal 145. For clarity, the terms teeth and notches will both be referred to as teeth with the understanding that notches are inferred as appropriate.

Sensor output signals 125, 145 are input to a Direct Digital Sampling Sensor Acquisition Unit 150 which comprises Analog-to-Digital (ADC) channels which sample the electrical signals 125, 145 output from the sensors 120, 140 at a rate many times faster than the tooth/notch detection rate at maximum engine rotation speed. The sampled electrical signals contain sensor signal noise content which is detected and removed using a linear or non-linear digital signal processing or trending noise detection scheme. The subsequent signal is then analyzed for tooth edge detections indicated by the zero-Amplitude crossings of the signal at those times when the signal slope is at maximum vertical direction. As the tooth edge approaches the sensor, the signal rises in amplitude (positive slope), and as the edge moves away from the sensor, the signal falls in amplitude (negative slope). The tooth edge time relative to crossing the sensor zero-Amplitude centerline will occur when the signal slope has maximum magnitude.

The resulting tooth events (tooth edge detection times) are passed to a Correlation Engine Unit 160. The Correlation Engine Unit 160 processes the tooth event times, converting them to angular tooth width equivalents, as will be described later, and compares this data stream with a Match Signature Template Unit 170 which describes the expected tooth angle patterns. Comparison is performed using a correlation operation described later. When a detected match occurs indicating pattern detection, synchronization to the crankshaft is declared. That is, the engine is assumed to be at the absolute crankshaft angle position specified by the user for that pattern. This angular position is usually taken as the position of the crankshaft relative to its position when the piston of the first cylinder in the ignition firing order is at top dead center (TDC) in the cylinder bore.

A Time/Crankshaft-Angle Event Engine Unit 180 obtains an absolute crankshaft/camshaft position variable from the Correlation Engine Unit 160. This position variable is initialized at the time of pattern match, and updated in small angular increments by the correlation engine, which continues wheel tooth detections and so maintains position synchronization. The position variable is compared in the Time/Crankshaft-Angle Event Engine Unit 180 against a list of various engine events which are calculated and transmitted by an engine management system in crankshaft angle degrees. The engine management system may or may not be a superset of the engine position tracking system. When matches occur, the Event Engine Unit 180 triggers activation/deactivation of various signals which control the engine. Triggered events can be terminated based on subsequent position variable events or can expire based on defined elapsed times, both of which may also be provided by the engine management system.

Figure 2:
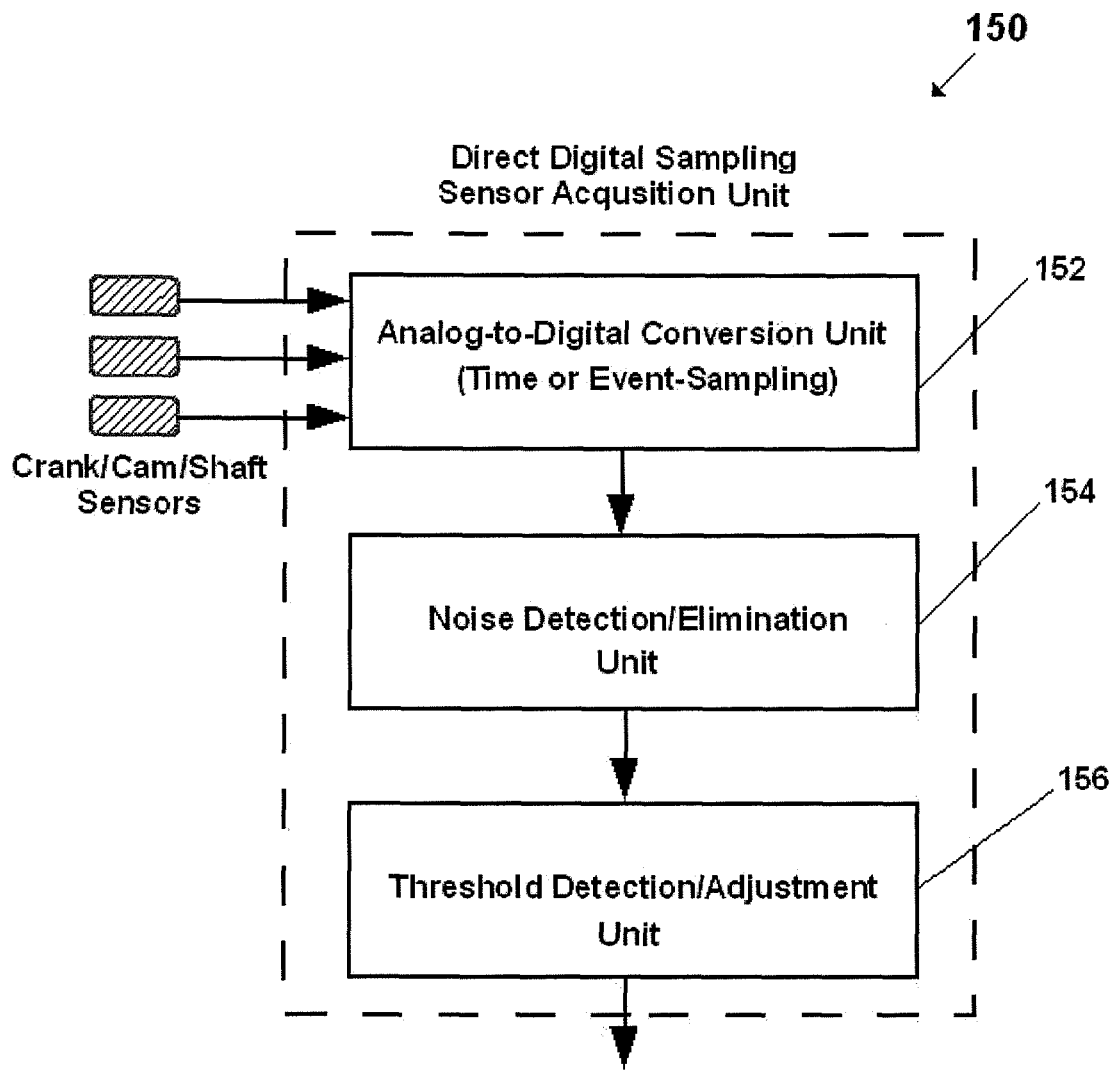
FIG. 2 is a block diagram illustrating an overview of the Direct Digital Sampling Sensor Acquisition Unit according to an exemplary embodiment of the present invention.

FIG. 2. is a block diagram illustrating an overview of the Direct Digital Sampling Sensor Acquisition Unit according to an exemplary embodiment of the present invention.

As shown in FIG. 2 the Direct Digital Sampling (DDS) Sensor Acquisition Unit 150 interfaces directly to one or more rotating member sensors, for example, but not limited to, sensors associated with a crankshaft, camshaft, or other rotating shaft, and provides sensor sampling, noise detection, and level thresholding. There are numerous types of position sensors used in rotating member applications. One is the variable reluctance sensor type, which detects a change in magnetic flux concentration induced from a timing wheel having one or more raised teeth or depressions which is affixed to a shaft. Hall-effect sensors use the well-known Hall effect to determine proximity to timing wheel teeth or notches. Optical sensors use the interruption of light to detect the timing wheel tooth position. An engine setup will often have a mix of the sensor types described here, and the presented embodiment will operate with this and other sensor configurations.

In one exemplary embodiment used to detect a sensor output signal level or change in sensor output signal level, a fixed or variable electrical voltage potential may be defined as a threshold level and a comparator circuit may compare an instantaneous sensor output voltage to the threshold level and provide a digital output signal indicating whether the sensor voltage is above or below the threshold level. A comparator transition (polarity dependent) denotes a tooth detection event. Common hardware implementations of thresholding may involve analog or digital circuits. Often, the threshold level is a fixed potential and may have an applied hysteresis component depending on sensor voltage polarity.

In the exemplary embodiment described herein, the method used for sensor output signal acquisition is known as Direct Digital Sampling (DDS). In DDS, a high-speed analog-to-digital converter (ADC) 152, which may be either part of a microcontroller or microprocessor, or an external semiconductor device interfaced to a microprocessor, microcontroller, programmable logic device or ASIC by either parallel or serial means, is used to directly sample the instantaneous sensor output signal. The sensor output signal may need to be scaled, offset and clipped such that a wide dynamic range of the sensor is captured by the ADC 152. The ADC sampling rate may either be at a fixed time interval or adjusted dynamically to match the rotational speed of a timing wheel under measurement. Sampling must be performed at a rate much greater than the time between teeth/notch events and at the bandwidth of the different shaft rotation speeds to be encountered.

The sampled sensor output signal is converted to ADC counts resulting in a digitized sensor data stream and is introduced into a Noise Detection/Elimination Unit 154. It should be noted that the digitized sensor data stream is beneficial when attempting to diagnose sensor signal integrity in the field. The resultant samples can be extracted in serial or parallel fashion by, for example, but not limited to, a portable computer or other data acquisition device, and displayed graphically on an external display device, for example, but not limited to, a terminal or LCD display. In this way, noise artifacts are immediately recognized in the resultant waveform by the end user and can be a diagnostic aid to assist in locating the source of the noise component.

Signals obtained from rotating shaft detectors can be noisy due to the harsh electrical operating environment in which they operate. To eliminate sensor noise, the digitized sensor data stream is analyzed and, if required, noise artifacts are removed. There are numerous digital noise detection algorithms available that would be of benefit. One is the use of a median filter. An odd number MS of sampled data points is maintained in a buffer, and as new data samples are captured they enter the beginning of the buffer and all points within the buffer shift by one. In this method, the last Ms sampled points are analyzed. Within this buffer, the values are sorted using any sorting method known in the art from lowest to highest value. The median value $((Ms/2)+1)$ is used as the resultant value of the median filter and passes to the next processing unit (threshold detection). In this manner, noise artifacts tend to end up at one or the other end of the sorted buffer, and the resultant value used is always the median value. There is a tradeoff in buffer size vs. phase delay in apparent sensor response, but a buffer size of 3 to 5 is usually sufficient to eliminate noise with fast rise times. The method of median filter described here is one of many different filtering methods that may be implemented in this exemplary embodiment.

The filtered digitized sensor data stream is next presented to the Threshold Detection Unit 156. The Threshold Detection Unit 156 has at least two purposes: one is to determine if the filtered digitized sensor data stream values have crossed a threshold boundary thereby denoting a tooth event, and another is to determine future threshold boundaries which may be variable due to factors such as noise, rotation speed, etc. Detection of a filtered digitized sensor data stream value transition past a threshold value may be accomplished by numerical comparisons employed to detect if a previous value and a current value are straddling the threshold value. Normally, the zero-crossing point is defined for sensor signals of bipolar out characteristics (like variable reluctance sensors) as the zero-voltage transition. Another method is to calculate the numeric derivative of the filtered digitized sensor data stream and identify periods of maximum amplitude, denoting the point where the original sensor signal is experiencing maximum transition (normally at the zero-crossing point). For other sensor types the signal may be an abrupt change-of-state of signal value, this denotes the transition point.

Threshold values can be determined by a multitude of different methods. Some implementations can use a fixed sample value as a threshold value. Other methods can adjust the threshold point based on trending of the filtered digitized sensor data stream in order to further reject data noise. For example, a filtered digitized sensor data stream trending in a decreasing numeric value may have a lower threshold detection point compared to increasing filtered digitized sensor data stream trends. This adds a component of hysteresis to the detection point. Other comparison methods may be employed without departure from the scope of the invention.

Figure 3:
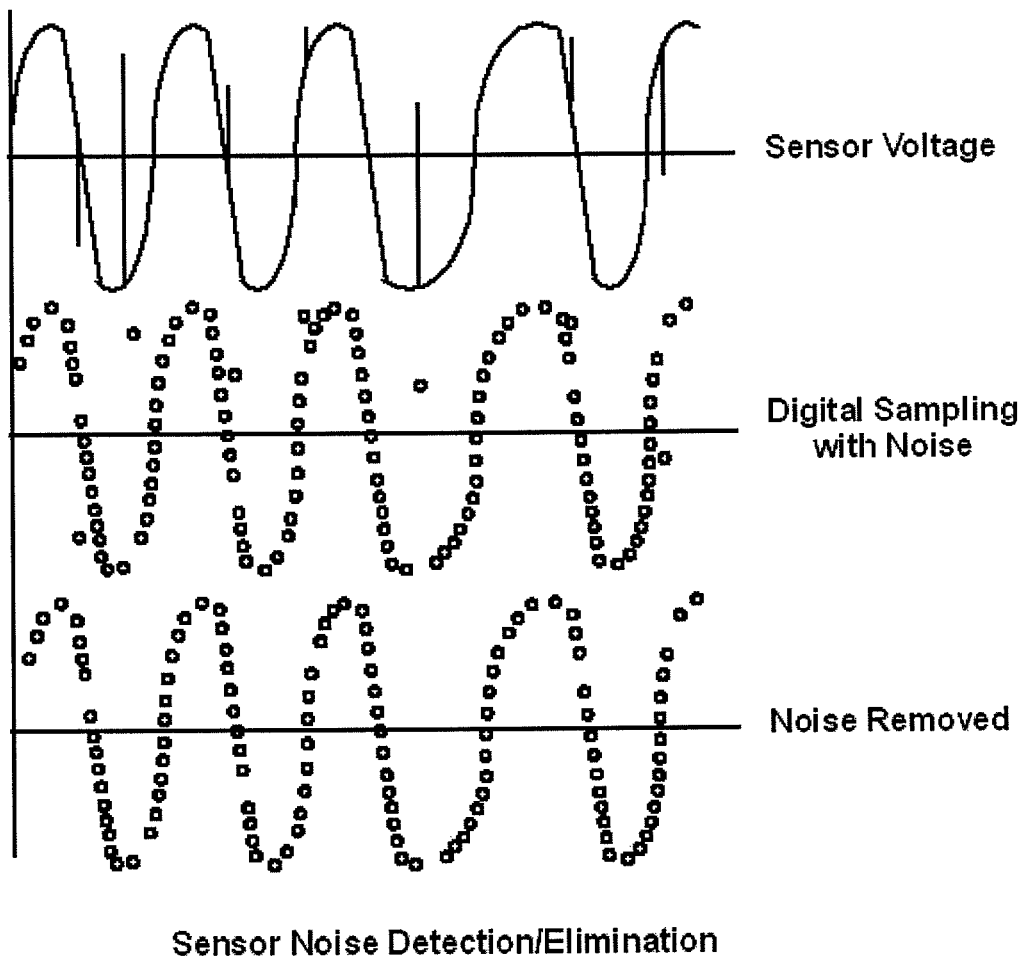
FIG. 3 is a graph illustrating sensor output voltage with noise, sensor sampled voltage, and sensor sampled voltage with noise removal according to an exemplary embodiment of the present invention.

FIG. 3. is a graph illustrating sensor output voltage with noise, sensor sampled voltage, and sensor sampled voltage with noise removal according to an exemplary embodiment of the present invention. The information shown in FIG. 3 is input to the correlation engine section of the exemplary embodiment. The following describes operation of the correlation engine section.

Correlation Engine—Inputs. The Correlation Engine analyzes toothed timing wheel signal levels or edges in conjunction with user timing wheel description inputs, and from this determines engine position and rpm. Typically 1-3 timing wheels are specified. The configuration parameters for each timing wheel are as follows.

1. Mounting. The timing wheel may be mounted on or driven from the crankshaft, which, for a four-stroke engine turns twice per 720 degree engine cycle, or mounted on or driven from the camshaft, which turns at half the crankshaft speed. All timing and engine position angles are by convention specified in crankshaft degrees, so a camshaft mounted timing wheel turning 360 degrees is equivalent to a crankshaft mounted timing wheel turning 720 crankshaft degrees. For a two-stroke engine, both timing wheels turn at the same speed, so one engine cycle is 360 degrees.

2. Detection. The digitized sensor data stream from the DDS can be polled at a high rate, for example, 4 microseconds, to detect rising or falling signal edges, or it can trigger an Input Capture interrupt in the processor. There may be a separate sensor and interrupt for each wheel. The user can specify whether a rising edge, falling edge or either edge define a tooth detection, at which point a time between current clock (for example, at 1 microsecond intervals) and a previous detection is calculated.

3. Timing wheel description. Each timing wheel is described by its number of teeth, where a tooth is defined as starting at a detection edge or voltage level and ending at the next detection edge or level change. In addition, each tooth is described by the number of crankshaft degrees of rotation between detection edges. For example, a 36-tooth crankshaft-mounted timing wheel, detected on the rising edge only, would be specified by thirty-six angles of 10 degrees each. If one of the teeth were missing, there would only be 35 teeth and the missing tooth would be described as the 35th and last angle with a width of 20 degrees. If detection of both edges was specified, then for this same timing wheel there would be 72 teeth, each with 5 degrees of width.

The sum of all the tooth angles must always be 360 degrees for a crankshaft mounted timing wheel and 720 degrees for a camshaft mounted timing wheel (360 degrees on a two-stroke engine). Angle resolution will be between 0.1 and 1.0 degrees, depending on the capabilities of the processor with respect to the rpm limits of the engine. In practice, there are at most 360 separate teeth per timing wheel.

4. Timing wheel type and patterns. Although timing wheels have high and low sections (teeth and notches), there are three types of timing wheels characterized according to their operation: toothed, gated, or rev indicator. A toothed timing wheel pattern is similar to the timing wheel description above, except it is a unique subset of the above pattern. There are in practice generally no more than four patterns per timing wheel. So, for the example of the thirty-six tooth timing wheel, instead of all teeth being 10 degrees, they may vary in different patterns in each 90 degree quadrant. In a first quadrant, the tooth pattern may be 9 teeth of 10 degrees each, a second quadrant may have 6 teeth of 15 degrees each, followed by a quadrant having a section with six teeth of 10 degrees each, then a section of two 15 degree teeth, and a last quadrant having another two 15 degree teeth, followed by six teeth of 10 degrees each. A pattern may also be as simple as 1 missing or 1 extra tooth. In this case the pattern would consist of one or two normal teeth, the missing/extra teeth, and another one or two normal teeth. The term normal or reference tooth means a tooth representative of the majority of teeth on the wheel. The complete timing wheel specification would consist of the preceding pattern plus all of the remaining reference teeth. Each specified pattern must be unique, so that when the measured tooth detections match this unique pattern, the engine position will be known, since a correctly assembled engine will be mechanically timed according to this pattern.

A gated timing wheel is specified by the number of teeth from another timing wheel that can fit within one of its gates, the gates being a few wide teeth. Typically, the other timing wheel has a large number of uniform teeth around its circumference, which provide good timing resolution, and the edges of the teeth are counted whenever the gate is high and/or low. An example is shown by the two wheels in FIG. 6. The match signature in this figure shows that three teeth from the top wheel can fit inside one of the wide teeth on the gated wheel.

Operation of the gated timing wheel is unaffected by acceleration or deceleration of the engine, as the gate and other timing wheel are mechanically locked together and the sensors are stationary. Therefore, the number of teeth counted within the gate is the same regardless of timing wheel speed. This configuration also provides a fast startup, since the gate count provides information for the processor to determine engine crankshaft position within one quadrant of the timing wheel instead of requiring up to a full crankshaft revolution to detect a single section of missing teeth.

If the gated timing wheel is specified for rising edge detection, then the tooth count starts at a rising edge and terminates at a falling edge, then starts again at the next rising edge. Falling edge detection is performed in a similar manner. If both edges are specified, then a pattern may start at either edge, and a new count is started every time a new edge is detected. Each such tooth count defines a new and unique pattern and there may in practice be up to 8 such gated patterns, each one specified by a single tooth count and an engine angle position for each pattern.

The last item in each of the patterns, whether toothed or gated, is an engine crankshaft position. For crankshaft mounted timing wheels on four-stroke engines, there are two engine crankshaft positions, one for each of the two crankshaft revolutions that comprise each 720 degree engine cycle. Only the first engine crankshaft position will be specified by the user. For two-stroke engines or camshaft-mounted timing wheels, there is only one possible crankshaft position for a unique pattern match, and the user must specify this position. Once a pattern match is achieved, engine crankshaft position is said to be synchronized in the sense that at the moment of pattern matching the processor knows either that the engine crankshaft is at one of two possible positions, or it knows the unique engine crankshaft position. Synchronization in the first case is termed wasted spark synchronization. The term wasted spark is used because at synch, either of two cylinders in a pair can be ready for ignition, that is, one cylinder is in a compression stroke, which is desired for combustion, the other is on its exhaust stroke. The processor, not knowing which cylinder of the pair is in the proper position, must ignite the spark in both of them. One cylinder will combust and the other cylinder will have a "wasted" spark because the exhaust gas does not combust.

Synchronization in the second case is termed sequential synch, because the processor can thereafter begin fueling and ignition for each individual cylinder. The wasted spark situation can continue as long as the engine continues running, or a revolution indicator type (camshaft mounted) wheel, as described in later, can be added into the engine design so that when a positive indication is obtained from this wheel, sequential synch can be obtained by the processor, which then switches to this mode and only ignites one cylinder at a time.

The third timing wheel type is a cam wheel with one pattern or two diametrically opposed patterns that indicate whether the crankshaft timing wheel is on its first or second revolution, the first revolution being the one in which the number one cylinder reaches top dead center (TDC) for the compression stroke. For timing these wheels the number of verifications is specified. This means that, for each revolution of the crankshaft, a count is kept of whether there was a pattern match on the cam pattern (or no detects on the second rev for a cam wheel with only one pattern). When the specified number of verifications is achieved, sequential synch is declared, and the engine crankshaft angle position will wrap around every 720 degrees instead of every 360 deg.

Correlation Engine—Operation Prior to Sync. The timing wheel combinations that must be covered are:

(i). one toothed crankshaft timing wheel. This configuration provides wasted synch.

(ii). one toothed camshaft timing wheel. This configuration provides only sequential synch.

(iii). one toothed crankshaft timing wheel, and one cam wheel which indicates which crankshaft revolution is true TDC of the compression stroke and which is TDC of the exhaust stroke. In this case, wasted synch is first achieved on the crankshaft timing wheel. After sufficient verifications of the crankshaft revolutions, sequential synch is declared and the cam wheel is no longer examined unless synch is lost.

(iv). one gated crankshaft timing wheel, one toothed crankshaft timing wheel. This configuration provides only wasted synch.

(v). one gated crankshaft timing wheel, one toothed crankshaft timing wheel, and one cam wheel which indicates which crankshaft revolution is true TDC of the compression stroke. This configuration gives wasted synch first, then sequential synch after the cam pattern detections are sufficiently verified.

(vi). one toothed crankshaft timing wheel with no patterns (i.e., all same size teeth) and one toothed crankshaft timing wheel with arbitrary patterns, including a single tooth. This configuration provides only wasted synch.

The gated and rev indicator synch logic is straightforward, as described. Pattern matching for other toothed wheel combinations can be achieved by at least two techniques: a correlation and a mean squared error technique. The correlation technique operates in the following manner. A pattern, p, is specified by a set of consecutive tooth angles, $\theta_{p,j}$, j=1 to Np, the number of teeth in the pattern. After a set of Np measurements of times, $\Delta t_i$, between teeth has been taken by the processor, the times are scaled to equivalent crankshaft angles, $\Phi i$, by:

$$\phi_i = \left[\frac{\Delta t_i}{\sum_{j=1}^{Np} \Delta t_j}\right] \cdot \sum_{j=1}^{Np} \theta_{p,j}$$

The pattern correlation coefficient between $\theta_{p,i}$ and $\Phi_i$ is then calculated as:

$$Cp = \frac{\left[\sum_{j=1}^{Np}(\theta_{p,j} \cdot \phi_j)\right]^2}{\sum_{j=1}^{Np} \theta_{p,j}^2 \cdot \sum_{j=1}^{Np} \phi_j^2}$$

where Cp is the correlation probability, which is 1.0 when all the $\Phi_i = \theta_{p,i}$, that is, a perfect pattern match, and is guaranteed to always be less than or equal to 1.0 by the Cauchy-Schwarz inequality. The summation is again the sum from j=1 to Np. In practice, Cp is thresholded by a threshold probability, typically between 0.80 to 0.95. If Cp is greater than the threshold, a match (engine synch) is declared and the processor now knows the engine crankshaft angle position based on the user specified position for each pattern when a match occurs.

Unless a match does occur, this process is repeated for all other user specified unique timing wheel tooth patterns. When the next tooth edge detection occurs, the $\Delta t_i$ array is updated by shifting the data so as to drop the oldest time measurement and add in the newest. The $\Phi_i$ and Cp are then re-calculated and another test made for pattern matching.

For the second technique, the same basic inputs and measurement scheme are used, but instead of performing a correlation test, a mean square error check is made. The same time between teeth, $\Delta t_i$, measurements are made, and scaled to be angles, $\Phi_i$. The error at each measurement is then:

$$e_j = \Phi_j - \theta_{p,j}$$

and the sum mean squared error is:

$$E2 = \frac{\sum_{j=1}^{Np}(e_j^2)}{Np}$$

which can be considered a pattern match if $$E2 < \text{ERR\_THRESH}**2,$$

the latter being a user input threshold in degrees. As for the correlation technique, the pattern match is performed for every pattern for which sufficient points have been accumulated, and is repeated every time a new tooth edge is detected. The advantage of the sum mean square error is that the calculations are faster and the thresholding is more intuitive.

Correlation Engine—Operation After Synch. If synch occurs as wasted synch, the program would start outputting engine angle position every t microseconds, t depending on what is achievable by the processor and the engine rpm limit. The angle position should be an integer representing the number of r degree increments in the angle position, where r is the desired resolution, typically somewhere between 0.1 and 1.0 deg. No increment should be skipped unless the engine speed exceeds the processor capability. This simplifies determining when engine events should occur by reducing it to a simple equality check rather than lees than/greater than comparisons, which become more difficult when the angular position crosses from 360/720 degrees to 0 degrees.

The initial crankshaft angle position is based on the specified timing wheel pattern used to achieve synch. The incrementing of the angle may be performed by using at microsecond clock interrupt. Based on measuring the $\Delta t_i$ for each tooth in the primary timing wheel (which the user will have to specify) and knowing the number of degrees specified for the tooth in the timing wheel description, an estimate can be made of the time for the crankshaft to travel r degrees. During the periods between tooth detections the processor will maintain an engine crankshaft angle position incremented every r degrees based on the last tooth timing and known tooth angular width. If this position update is too fast and the new position is about to exceed the next known tooth position, then the crankshaft angle position is held constant until the next tooth arrives, so the estimated crankshaft angle position will not get ahead of the actual crankshaft angle position. When a new tooth is detected, the engine crankshaft angle position is now known exactly, from the timing wheel pattern description, and this is compared to the processor estimated crankshaft angle position. If they match, the processor continues updating the crankshaft angle position as before, using the new estimate of angle rate.

Conversely, if a new tooth detection occurs and the estimated crankshaft angle position is found to be lagging behind the actual crankshaft angle position by S increments of r degrees, then for the next tooth period the crankshaft angle position must be incremented every t microseconds regardless of whether it is time for it or not until S increments have been counted down. The increment is always 1, that is, r degrees, so if it is time for a normal update the increment is still 1. In this manner, it is assured that the processor always puts out every possible r degree position at a rate that is as consistent as possible with the incoming tooth detection data. This is continued until reaching a position of 360−r degrees, after which engine position is reset to 0 degrees and continues on. In sequential synch the same procedure is followed, except the maximum engine position is 720−r degrees.

Another task to be performed after synch is to ensure that the engine remains in synch. This is done whenever a new tooth arrives by checking that the new time between teeth, $\Delta t_i$, does not differ from the preceding time between teeth, $\Delta t_{i-1}$, by more than pulse_tolerance %, the latter being a user input for each wheel. If pulse_tolerance is input as 0 or 100%, then no check should be made. This would generally be done for a cam wheel used only as a rev indicator. If the pulse tolerance is exceeded, lost synch must be set and provision made for re-synching in the same manner as at startup.

For a gated wheel, the tooth count within each gate must match the number specified in the pattern. The pulse tolerance has no meaning in this case, as the specified teeth should always occur. However, to allow for electronic noise, pulse_tolerance can represent the number of consecutive times a missed gate tooth count is allowed to occur before loss of synch.

The following are outputs which the processor provides:

synch indication: none, wasted or sequential. If loss of synch occurs, the processor outputs an indication of which timing wheel caused the loss of synch and a value of a counter that increments each time loss of synch occurs.

Revolutions-per-minute (rpm) calculated from the latest tooth $\Delta t_i$ for the primary timing wheel and the angular width for that tooth, as specified in the timing wheel description.

real time engine crankshaft angle position in integer number of resolution degrees.

Figure 4:
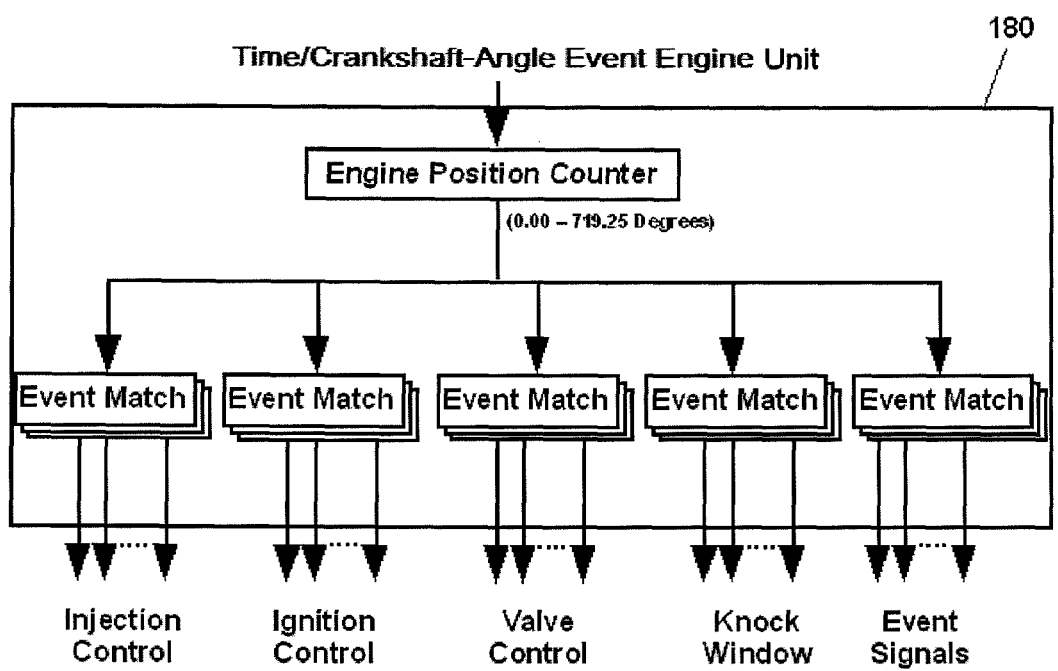
FIG. 4 is a block diagram illustrating a Time/Crankshaft-Angle Event Engine according to an exemplary embodiment of the present invention.

Time/Crankshaft Angle Event Engine. FIG. 4 is a block diagram illustrating a Time/Crankshaft-Angle Event Engine according to an exemplary embodiment of the present invention. The reason for the use of an integer engine crankshaft angle position that does not skip an increment is to facilitate angle-based engine control. Events and controls can be identified by equality of the current engine crankshaft angle position and the engine crankshaft angle position at which a control action is desired. This avoids greater-than or less-than comparisons which become complicated when the engine crankshaft angle position angle wraps around at 360 or 720 degrees.

Thus, fuel injection control is reduced to simply specifying an engine crankshaft angle position and injector pin number to the event engine, which then automatically opens the proper injector. At that time a clock to close the injector can be started and the injector will be closed after precisely the desired time duration. The same applies to ignition (spark) timing for which precise spark angles can be specified and are guaranteed accurate to within r degrees of resolution throughout the rpm range of the engine, regardless of engine acceleration or deceleration. Also, multiple fuel injections and sparking within the same engine cycle can be specified for each cylinder, providing more thorough fuel mixing and fuel combustion.

Another area for angle-based control that is becoming increasingly important is for control of the intake and exhaust valve timing, allowing optimized engine airflow to suit the conditions at hand. This could take the form of controlling any and all of valve open and close times, open time duration, and intake and exhaust overlap region.

Other angle-based control applications include setting knock windows so that sensing of spark knock for a cylinder is only performed when an engine position-based window for that cylinder is open. This allows knock sensing to be performed only over the interval during which detonation is most likely to occur, thereby reducing the probability of false detections. Exhaust gas sensing can also be windowed to sample when the exhaust cycle is active, thereby distinguishing between reversion of intake air and unburned combustion oxygen. Since there can be large variations in air flow and pressure entering each cylinder, the sampling of sensors for these quantities can also be based on engine crankshaft angle position to obtain more consistent measurements.

For example, Speed-Density arrangements utilize a Manifold Absolute Pressure sensor to determine air mass entering the intake. The pressure measurement occurs in the intake manifold which is used to represent the cylinder pressure. It is important to synchronize the sampling event of the sensor with the engine cycle, and in some cases present multiple samples over a cylinder event in order to integrate the result. Other sensors can also benefit in the use of synchronous sampling.

Figure 5:
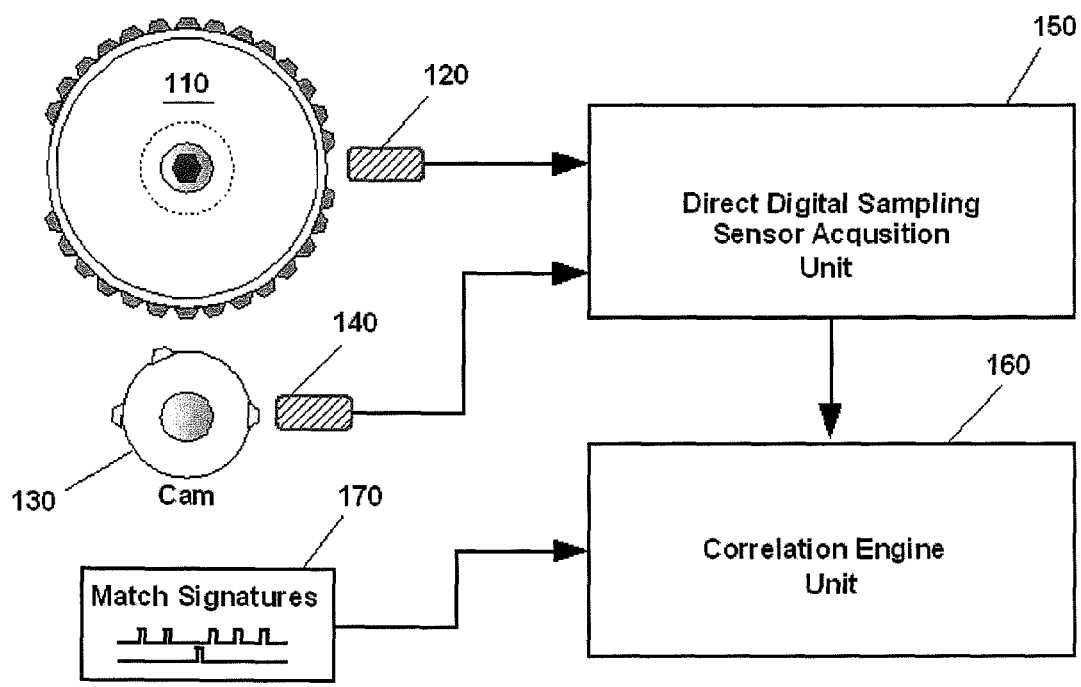
FIG. 5 is a block diagram of a system with multiple crankshaft timing wheel tooth patterns according to an exemplary embodiment of the present invention.
Figure 6:
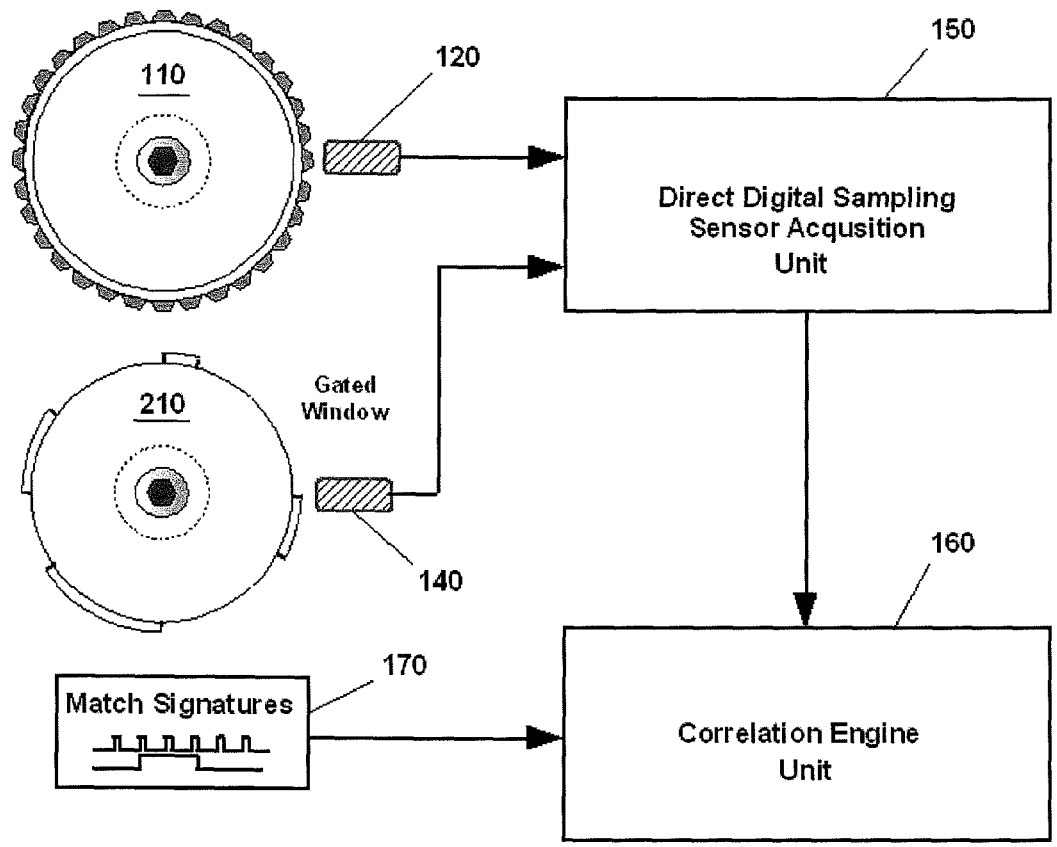
FIG. 6 is a block diagram of a system with gated-signal crankshaft timing wheel tooth patterns according to an exemplary embodiment of the present invention.

FIG. 5 and FIG. 6 illustrate two possible crankshaft and camshaft timing wheel arrangements. However, the invention may be applied to different crankshaft and camshaft timing of arrangements. FIG. 5 is a block diagram of a system with multiple crankshaft timing wheel tooth patterns according to an exemplary embodiment of the present invention. FIG. 5 is an example of multiple missing tooth positions on the crankshaft timing wheel 110 as well as multiple sets of teeth on the camshaft timing wheel 130. With the use of a pattern template, practically any arrangement of teeth can be used as long as there is a corresponding pattern defined.

FIG. 6 is a block diagram of a system with gated-signal crankshaft timing wheel tooth patterns according to an exemplary embodiment of the present invention. FIG. 6 shows a gated tooth arrangement where one timing wheel 210 is used as a gate for a second tooth pattern. Again, a match pattern can be defined for this arrangement. It is easily seen here the flexible arrangement offered with the pattern match—many different patterns can be pre-defined to account for a vast number of possible wheel combinations.

Exemplary embodiments of the inventions described herein may be implemented as software such as tasks, classes, sub-routines, processes, objects, execution threads, and programs, or hardware such as a Field-Programmable Gate Array (FPGA) or an ASIC (Application-Specific Integrated Circuit), and may also be implemented as a combination of software and the hardware. The elements may be embodied in storage media which is readable by a computer, for example, but not limited to magnetic storage media, optical storage media and solid state storage media.

Exemplary embodiments of the invention defined herein define multiple functional units. Each unit can be used separately or in concert. Thus, while only certain exemplary embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the exemplary embodiments described therein.

The foregoing description of the exemplary embodiments of the invention has been presented for purposes of illustration and description. It is not intended to be exhaustive or to limit the invention to the precise form disclosed, and modifications and variations are possible in light of the above teachings or may be acquired from practice of the invention. The exemplary embodiments were chosen and described in order to explain the principles of the invention and its practical application to enable one skilled in the art to utilize the invention in various exemplary embodiments and with various modifications as are suited to the particular use contemplated.

What is claimed is:

1. A method of determining an instantaneous absolute engine crankshaft angle position, the method comprising:
   inputting from an external source crankshaft timing wheel configuration data comprising tooth pattern angles;
   measuring tooth time inputs of an engine-mounted timing wheel;
   scaling the tooth time inputs into angles in an angle domain;
   cross-correlating the angles with stored tooth pattern angles; and
   determining the instantaneous absolute engine crankshaft angle position as a result of a match between the angles and the stored tooth pattern angles.

2. A method of determining an instantaneous absolute engine crankshaft angle position, the method comprising:
   measuring tooth time inputs of an engine-mounted timing wheel;
   scaling the tooth time inputs into angles in an angle domain;
   cross-correlating the angles with stored tooth pattern angles; and
   determining the instantaneous absolute engine crankshaft angle as a result of thresholding mean square errors between the angles and the stored tooth pattern angles.

3. A computer readable medium having stored therein a program for making a computer execute a method of determining an instantaneous absolute engine crankshaft angle position, said program including computer executable instructions for performing the method comprising:
- inputting from an external source crankshaft timing wheel configuration data comprising tooth pattern angles;
- measuring tooth time inputs of an engine-mounted timing wheel;
- scaling the tooth time inputs into angles in an angle domain;
- cross-correlating the angles with stored tooth pattern angles; and
- determining the instantaneous absolute engine crankshaft angle position as a result of a match between the angles and the stored tooth pattern angles.

4. A computer readable medium having stored therein a program for making a computer execute a method of determining an instantaneous absolute engine crankshaft angle position, said program including computer executable instructions for performing the method comprising:
- measuring tooth time inputs of an engine-mounted timing wheel;
- scaling the tooth time inputs into angles in an angle domain;
- cross-correlating the angles with stored tooth pattern angles; and
- determining the instantaneous absolute engine crankshaft angle as a result of thresholding mean square errors between the angles and the stored tooth pattern angles.

* * * * *